(12) United States Patent
Bär et al.

(10) Patent No.: US 7,820,991 B2
(45) Date of Patent: Oct. 26, 2010

(54) RADIATION SOURCE AND DEVICE

(75) Inventors: K.O. Kai Bär, Bruckmühl (DE); Rainer Gaus, Bruckmühl (DE); Günther Gesell, Stephanskirchen (DE); Torsten Berge, München (DE)

(73) Assignees: AdPhos Innovative Technologies GmbH, Bruckmuhl (DE); KHS Corpoplast GmbH & Co. KG, Hamburg (DE)

( * ) Notice: Subject to any disclaimer, the term of this patent is extended or adjusted under 35 U.S.C. 154(b) by 1319 days.

(21) Appl. No.: 10/380,996

(22) PCT Filed: Sep. 12, 2001

(86) PCT No.: PCT/EP01/10539
§ 371 (c)(1),
(2), (4) Date: Mar. 18, 2003

(87) PCT Pub. No.: WO02/23590
PCT Pub. Date: Mar. 21, 2002

(65) Prior Publication Data
US 2003/0183785 A1    Oct. 2, 2003

(30) Foreign Application Priority Data
Sep. 18, 2000  (DE)  ................. 100 46 161
Oct. 19, 2000  (DE)  ................. 100 51 905

(51) Int. Cl.
*G01J 1/00* (2006.01)
(52) U.S. Cl. .............. 250/495.1; 250/504 R; 313/634; 313/493

(58) Field of Classification Search ............ 250/495.1; 313/579
See application file for complete search history.

(56) References Cited

U.S. PATENT DOCUMENTS
3,582,703 A * 6/1971 Takahashi et al. ........... 313/579
(Continued)

FOREIGN PATENT DOCUMENTS
AT        269283        3/1969
(Continued)

OTHER PUBLICATIONS
PCT International Search Report (5 pgs.); Appl. No. PCT/EP 01/10539.

*Primary Examiner*—David A. Vanore
*Assistant Examiner*—Phillip A. Johnston
(74) *Attorney, Agent, or Firm*—Armstrong Teasdale LLP

(57) ABSTRACT

Radiation source for electromagnetic radiation the major effective component of which is in the near-infrared region, in particular in the wavelength region between 0.8 μm and 1.5 μm, to form an elongated irradiation zone, with an elongated halogen lamp comprising a glass body that has a tubular shape with bases at the ends and contains at least one spiral filament, and with an elongated reflector, such that the bases of the halogen lamp are disposed in the region of the reflector surface or behind it with reference to the position of the halogen lamp, wherein the ends of the halogen lamp are bent around toward the reflector and the spiral filaments or at least one of them is made thicker or is more densely wound in the bent region of the glass body, in such a way that the radiation flux density of the radiation source is substantially constant in the long direction of the source, between the outermost points of the bases.

20 Claims, 2 Drawing Sheets

U.S. PATENT DOCUMENTS

| | | |
|---|---|---|
| 4,287,554 A | 9/1981 | Wolff |
| 4,411,516 A * | 10/1983 | Adachi et al. .................. 355/67 |
| 5,600,205 A | 2/1997 | Foss et al. |
| 5,747,780 A * | 5/1998 | Shioyama et al. ........... 219/648 |
| 5,984,749 A * | 11/1999 | Nishibori et al. ............... 445/26 |
| 6,205,677 B1 * | 3/2001 | Yune ........................... 34/266 |
| 6,227,682 B1 * | 5/2001 | Li ............................... 362/302 |
| 6,399,955 B1 * | 6/2002 | Fannon ................... 250/504 R |
| 6,437,290 B1 * | 8/2002 | Shao et al. .................. 219/390 |
| 6,690,103 B1 * | 2/2004 | Uke ........................... 313/344 |

FOREIGN PATENT DOCUMENTS

| | | |
|---|---|---|
| DE | 1 929 622 | 1/1970 |
| DE | G 88 02 042.8 | 4/1988 |
| DE | 297 02 002 U1 | 5/1997 |
| DE | 197 36 462 A1 | 2/1999 |
| DE | EP 0999724 A3 | 5/2000 |
| GB | 2 282 482 | 4/1995 |
| JP | EP 0187 998 A2 | 7/1986 |
| WO | WO 99/42774 | 8/1999 |

* cited by examiner

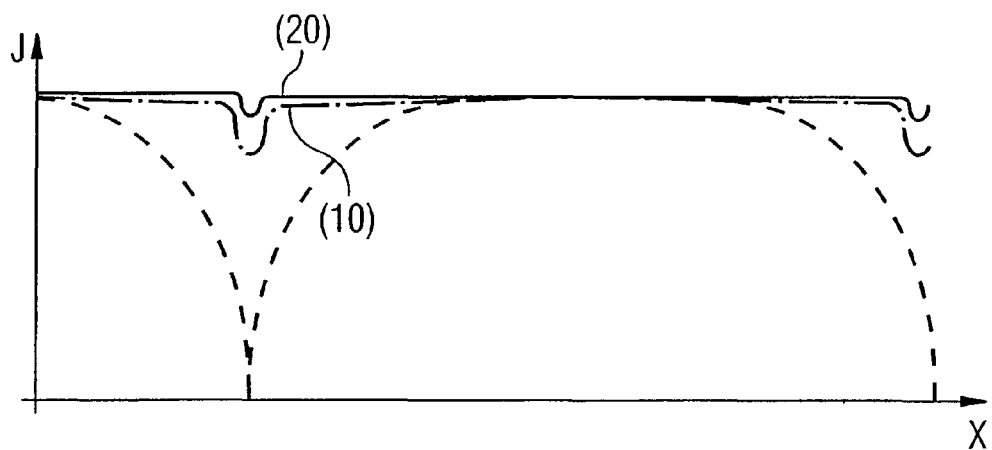

RADIATION SOURCE AND DEVICE

CROSS REFERENCE TO RELATED APPLICATIONS

This application claims the benefit of German Patent Application Number 100 46 161.1, filed Sep. 18, 2000, German Patent Application Number 100 51 905.9 filed Oct. 19, 2000, and PCT International Patent Application Number PCT/EP01/10539 filed Sep. 12, 2001, which are hereby incorporated by reference in their entirety.

BACKGROUND OF THE INVENTION

The invention relates to a radiation source according to the pre-characterizing clause of Claim 1 and to an arrangement for irradiation that incorporates such a radiation source.

Previous patent applications submitted by the present applicant, for example DE 197 36 462 A1, WO 99/42774 and P 10024731.8 (unpublished), have disclosed methods for treating surfaces, processing materials and manufacturing composite materials that involved the employment of electromagnetic radiation with a major effective component in the near-infrared region, in particular in the wavelength region between 0.8 µm and 1.5 µm. In several of these applications it is important for the irradiation to be incident upon a relatively wide area, to enhance the productivity of the method concerned. To achieve this goal, for the radiation source an elongated halogen lamp has been designed that comprises a glass tube with bases at the ends and at least one spiral filament, as well as an elongated reflector.

In known radiation sources or irradiation apparatus with elongated lamps having bases at both ends—for Instance, to be used for medical purposes or in illumination technology—the connectors or bases of such lamps are disposed coaxially at the ends of the glass tube; see, e.g., the patent documents U.S. Pat. No. 4,287,554 or DE 33 178 12 A1. These published documents also describe irradiation arrangements with several radiation sources disposed next to one another in parallel.

With a radiation source of this kind it is possible to irradiate a wide zone with a radiation flux density that is approximately constant over the entire width of the zone, which in turn makes the processing conditions uniform over a corresponding width of the material being processed. However, at the ends of the halogen lamp, in the vicinity of the bases, the radiation flux density decreases, so that in these regions other values of the process parameters apply. This is problematic in the case of applications that require a constant radiation flux density over the whole width of the product, because these regions are in principle not functional, so that the usable width of the irradiation zone, as far as processing technology is concerned, is smaller than the length of the radiation source.

Certain industrial processes that employ radiation in the near-infrared region ("NIR radiation") can in principle be carried out with materials having very wide dimensions. However, to produce individual halogen lamps of a correspondingly large width is technically difficult and extremely expensive. To implement such processes it would be desirable to assemble several elongated halogen lamps having the standard dimensions in lengthwise alignment with one another, so that the total length of the assembly of lamps equals the length of the zone to be irradiated. However, the above-mentioned fact that the radiation flux density decreases near the bases of the glass tube of an individual halogen lamp proves to be a particularly severe problem in this regard. Hence the currently available radiation-source constructions cannot be employed for such applications if it is essential that the radiation flux density be constant over the entire width of the processing region.

BRIEF DESCRIPTION OF THE INVENTION

It is thus the objective of the present invention to disclose a radiation source of this generic kind that has been improved so as to produce an irradiation zone with a width corresponding substantially to the length of the radiation source, over which the radiation flux density is substantially constant.

This objective is achieved by a radiation source with the characteristics stated in Claim 1.

The invention on one hand includes the fundamental idea that the ends of the lamp tube, regions in which it is of course impossible for radiation to be emitted, are repositioned so that they are behind—with respect to the material or halt-finished goods that are to be treated—the glass tube containing the spiral filament that emits the NIR radiation. The invention also includes the idea that this backward repositioning of the ends or connectors is achieved by bending the glass tube in the region near the ends.

Another idea included in the invention is that the spiral filament or (if several filaments are present in the glass tube) at least one spiral filament is made thicker in the above-mentioned region near the end, so that relatively more radiant energy in the NIR region is emitted there. This measure counteracts the decrease in radiation flux density that would otherwise be expected near the ends as a result of their backward displacement. The degree to which the filament is made thicker or more densely wound depends on the particular shape of the glass tube, specifically the radius of bending—an aspect that lies within the constructional judgement of a person skilled in the art, with sufficient guidelines obtainable from comparative tests with different patterns.

In an embodiment that is preferred because of its simplicity, at least one end of the halogen lamp is bent with a radius of curvature such that the end section is substantially at a right angle to the longitudinal direction of the lamp. Hence the lamp connectors are directed substantially at right angles to the longitudinal extent of the tube and the filament, so that it is a simple matter to position the connectors in a row behind the linear array of halogen lamps.

In an alternative embodiment at least one end of the halogen lamp comprises a section bent into a C shape, so that the outermost point of the base associated with this end is displaced inward by a slight amount with respect to the outermost point of the glass tube at this end. It is also possible to construct halogen lamps with a glass tube having this latter geometry at one end while the other end has the rectangularly bent configuration described above. The last-mentioned design enables (although with somewhat greater constructional effort regarding the halogen lamp) an improved means of arranging the radiation sources "seamlessly" end to end in a row, in order to achieve an extremely wide irradiation field with almost completely constant radiation flux density, because this design makes more space available for the structures supplying power to the lamp bases.

The ends of the halogen lamp are advantageously in thermally conducting contact with the reflector, and/or the bases are provided with cooling means to dissipate heat. As a result, there is a steep temperature (T) gradient between each of the curved regions at the glass tube and the adjacent connection region. In particular, a temperature decrease from more than 600° C. in the main body of the tube to a connector or end temperature well below 300° C., in particular below 200° C., is produced so that allowance is made for the thermal sensitivity of the ends of the lamps.

The above-mentioned cooling means in a first special embodiment comprise heat-radiating surfaces ("flags") at the ends of the lamp. Additionally or alternatively, plug-type bases are provided with special heat-conducting means to transfer heat to the reflector (which as a rule is essentially completely metallic and hence conducts heat away very well).

Still more efficient, although requiring more elaborate technology, is to employ a pressurized fluid coolant to carry the heat away from the lamp ends. For this purpose the cooling means comprise flow channels through which the coolant passes to the ends or nearby regions of the halogen lamp, and/or to the regions of the associated reflector that are near the lamp ends.

In particular there is provided in the reflector at least one compressed-air flow channel with outlet openings ("nozzles") directed towards the ends of the halogen lamp, through which cold compressed air—or another coolant gas—is conducted into these regions. In a preferred embodiment of this idea a plurality of compressed-air flow channels is provided in the reflector, each of which comprises outlet openings so disposed and constructed that the compressed air passing through them becomes turbulent around the ends or regions near the ends of the glass tube. This turbulent flow ensures reliable dissipation of the heat from all of the surface regions that are to be cooled.

Another preferred embodiment has water channels in the reflector, which pass through the reflector regions near the lamp bases. Through these channels cooling water is passed, which serves to cool both the reflector itself (which is directly exposed to radiation from the spiral filament) and also the ends of the lamps, indirectly by way of the thermal conductance between reflector and lamp ends.

An especially advantageous way to dissipate heat is provided by 25 reflectors constructed as massive extruded profiles of a material with high thermal conductivity, in particular aluminum or an aluminum alloy. The reason is that in such reflectors the flow channels for the coolant fluid (whether embodied as channels for compressed air or for water) can be incorporated particularly easily, and the massive construction of the reflector endows it with a high heat capacity and thus contributes toward making the radiation of heat away from the radiation source more uniform, even if there are slight inhomogeneities in the primary radiation profile of the spiral filament or slight fluctuations in the supplied voltage.

A reflector profile of this kind that provides especially advantageous reflection properties, which contribute to a long working life of the halogen lamp, and is also especially easy to manipulate in an irradiation system with modular construction, has a cross-sectional shape with a substantially rectangular external contour and a substantially W-shaped reflector surface, such that in particular two or three coolant flow channels are incorporated into the foot region between the "W" and the rectangular external contour.

An irradiation arrangement employing the solution in accordance with the invention comprises a plurality of radiation sources of the kind proposed here, at least two of which are lined up in a row, end to end. Thus the radiation flux density is substantially constant over the entire longitudinal extent of the lined-up radiation sources, from the outermost point on the first radiation source in the row to the outermost point on the last radiation source, at its opposite end. An advantageous implementation of an overall cooling system is obtained in an embodiment in which the coolant flow channels in the row of radiation sources are aligned with one another and connected to form continuous flow channels. Each of these has a connection element through which coolant is received, disposed at a first one in the row of radiation sources.

Such an irradiation arrangement can be used in particular for the NIR drying of lacquers or plastic coatings—specifically powder lacquers—as well as for manufacturing plastic laminates or the thermal treatment (specifically drying and/or producing cross-linkage) of thin-layer structures, especially thermally sensitive substrates in the area of semiconductor and display technology, and also in other applications such that the implementation of wide irradiation zones with almost ideally constant radiation flux density enhances the productivity of the procedure.

BRIEF DESCRIPTION OF THE DRAWINGS

Other advantages and useful features of the invention will be apparent from the subordinate claims and from the following description at preferred exemplary embodiments with reference to the figures, wherein FIG. 3 is a sketch representing the position dependence of the radiation flux density in the longitudinal direction of the irradiation arrangements according to FIG. 1 or 2.

DETAILED DESCRIPTION OF THE INVENTION

Figure 1:
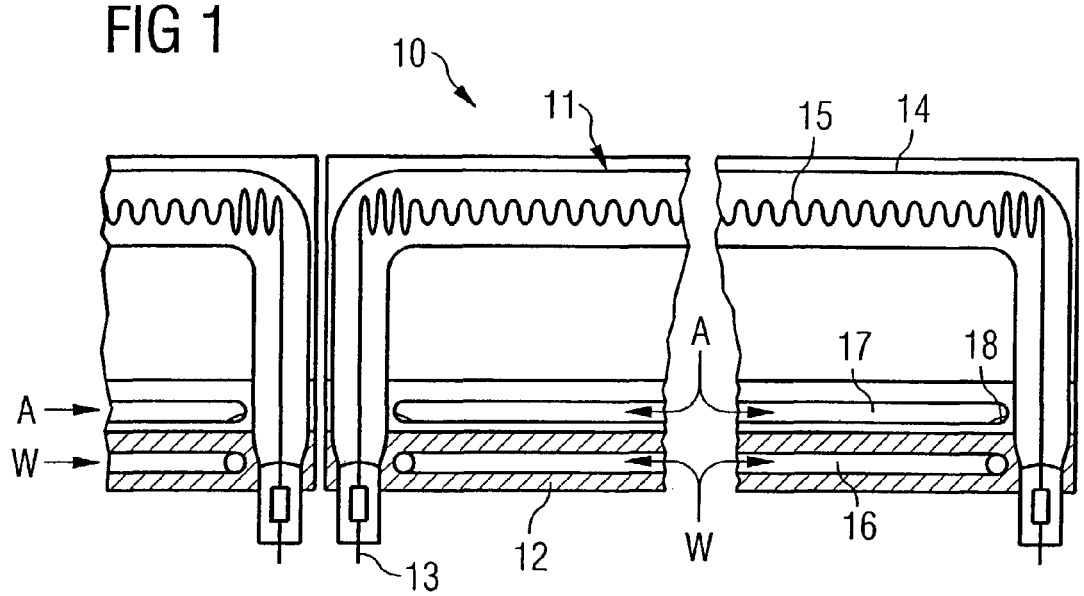
FIG. 1 shows part of an irradiation arrangement with a radiation source according to a first embodiment of the invention, represented as a longitudinal section.

FIG. 1 shows part of an NIR irradiation arrangement 10 for technological purposes, with a plurality of halogen filament lamps 11 disposed in a row extending in their long directions and aligned with one another, with each of which there is associated an elongated reflector 12 made of an aluminum extruded profile.

The basic structure of the reflector is known per se from the applicant's patent document EP 0 999 724 A2 and hence is not explained further here. In the following reference will be made only to special cooling devices disposed in the interior or the vicinity of the reflector.

As can be seen in the figure, the halogen filament lamp 11 has a glass body in the shape of a tube 14, which contains in its center an elongated spiral filament 15 and has at each of its two ends a connector pin 13. The lamp is operated at high voltage and therefore at an elevated operating temperature, above 2500 K and in particular above 2900 K, so that the radiation it emits has its major component in the near-infrared region, specifically in the wavelength region between 0.8 μm and 1.5 μm. The glass tube 14 is bent near its ends to form approximately a right angle, so that each of its connectors 13 is disposed on an end section that extends approximately perpendicular to the middle section of the tube. It can also be seen that the spiral filament 15 is progressively thickened as it approaches the "angled" region, and/or its spiral structure is more densely wound.

Because of the bending of the glass tube 14 toward the reflector and the associated connector, in combination with the thickened or condensed structure of the spiral filament 15, the halogen filament lamp 11 provides NIR radiation at a substantially constant radiation flux density over its length up to the lateral end regions.

In this regard reference is made to FIG. 3, in which the dashed line shows the distribution of radiation flux density of two conventional NIR lamps aligned end to end, whereas the position dependence of the radiation flux density in the longitudinal direction of the irradiation arrangement 10 shown in FIG. 1 is indicated (schematically) by a dot-dash line. The proposed construction thus enables several radiation sources to be lined up so as to form a linearly extended irradiation arrangement with no substantial reduction of the flux density at the sites where the lamps adjoin one another.

In the interior of the reflector 12 a cooling-water channel 16 is provided, to cool the reflector by passing water W through it. Near the reflector surface is disposed a compressed-air tubule 17 with air nozzles 18 positioned near the ends of the glass tubes 14 to which the connectors are attached; the cold compressed air A emerging from these nozzles impinges on this region of the glass tube. Because of this cooling of the ends of the lamps, in combination with the heat-dissipation ability of the massive metal reflector, a steep T gradient is produced. This gradient ensures that even though the temperature of the glass tube can exceed 600° C., it is possible to keep the ends of the tube at a temperature around or below 200° C., which is important for the working life of the radiation source.

Figure 2:
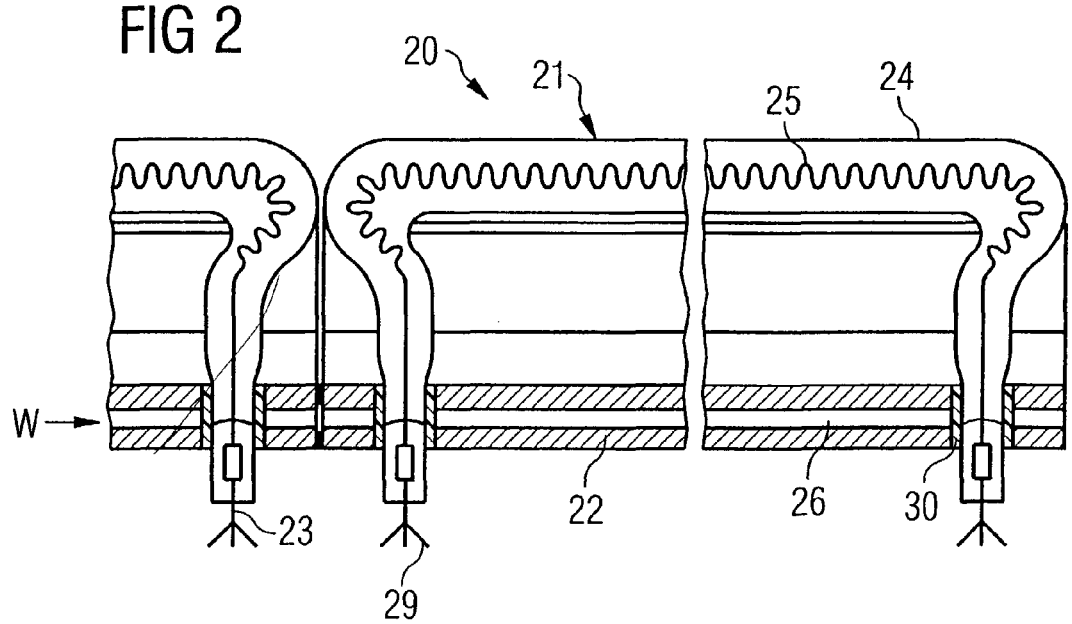
FIG. 2 shows part of an irradiation arrangement with a radiation source according to a second embodiment of the invention, represented as a longitudinal section.

FIG. 2 shows another exemplary embodiment of an irradiation arrangement 20, in which components with the same function as those in FIG. 1 are identified by reference numerals derived from those in FIG. 1.

It is evident that the reflector 22 in this case extends only to a point below the central axis of the glass tube 24 and hence of the spiral filament 25; another difference from the arrangement 10 shown in FIG. 1 is that here a cooling-water channel 26 runs continuously through the row of reflectors 22.

Furthermore, there is a substantial difference in the configuration of the halogen filament lamp 21, in that the geometry of the bent region near the end of the lamp has been modified. Here this region is substantially C-shaped, as a result of which the connectors 23 have been shifted inward with respect to the outermost points of the glass tube 24. This makes it possible, firstly, for the halogen lamps 21 to be even more closely apposed to one another; in addition, relatively large-area cooling surfaces (flags) 29 can be provided at the connectors 23. There are also provided, in the region where the ends of the lamps pass through the body of the reflector, sleeves 30 that serve both as tension equalizers and heat conductors, ensuring good heat transfer to the body of the reflector.

These measures, taken together and with no recourse to devices for active cooling by compressed air, likewise produce a relatively steep T gradient in the region of the lamp ends.

Because of the close apposition of the halogen lamps, which is enabled by the configuration of the glass tube shown in FIG. 2, in combination with the C-shaped configuration of the bent regions, it is possible for the radiation flux density along the row of several apposed radiation sources to be made extremely uniform, as indicated (again schematically) by the continuous line in FIG. 3. This is achieved to a certain degree even without any additional thickening or more dense winding of the spiral filament 25 in the bent region of the lamp tube.

The implementation of the invention is not restricted to the examples described above and the aspects emphasized here, but in the context of the claims is also possible in a large number of further modifications that are within the competence of a person skilled in the art.

What is claimed is:

1. A radiation source configured to generate electromagnetic radiation having a major effective component in a near-infrared region including a wavelength region of between 0.8 μm and 1.5 μm, said radiation source forming an elongated irradiation zone by using an elongated halogen lamp comprising:
    a glass body having a tubular shape and including a first bent region adjacent a first end of the glass body, a second bent region adjacent a second end of the glass body, and a substantially linear region extending between the first bent region and the second bent region;
    at least one spiral filament coupled within the glass body;
    an elongated reflector positioned adjacent to the glass body and defining a reflector surface; and
    connectors coupled at each of the first end and the second end and disposed in one of a region of the reflector surface and behind the reflector surface with reference to a position of the halogen lamp,
    wherein at least one end of the glass body is bent around toward the reflector at at least one of the first bent region and the second bent region, and
    wherein the at least one spiral filament is at least one of thicker and more densely wound in the bent regions of the glass body than in the substantially linear region of the glass body such that a radiation flux density of the radiation source is substantially constant in a longitudinal direction of the radiation source between outermost points of the first end and the second end.

2. A radiation source according to claim 1, wherein at least one end of the glass body is bent with a radius of curvature such that at least one end is at substantially a right angle with respect to the longitudinal direction of the glass body.

3. A radiation source according to claim 1, wherein at least one bent region is substantially in a C shape, such that the outermost point of the connector associated with the at least one bent region is shifted slightly inward in comparison to an outermost point of the glass body at the at least one bent region.

4. A radiation source according to claim 1, wherein the ends of the halogen lamp are coupled in thermally conductive contact with at least one of the reflector and a cooling device disposed at the ends of the glass body, the cooling device configured to dissipate heat such that a steep temperature (T) gradient having a T decrease is produced between the bent regions of the glass body and the connector adjacent to each of the bent regions, the T decrease from a glass-body temperature being above 600° C. to a base temperature below 300° C.

5. A radiation source according to claim 4, wherein the cooling device comprises heat-radiating surfaces at the ends of the halogen lamp.

6. A radiation source according to claim 4, wherein the cooling device comprises coolant flow channels configured to direct a coolant fluid that has been placed under pressure to at least one of the ends of the halogen lamp, regions near the ends, and regions of the reflector that are adjacent to the cooling device.

7. A radiation source according to claim 6, comprising at least one compressed-air flow channel that is one of defined in and positioned near the reflector, the at least one compressed-air flow channel comprising outlet openings directed toward the ends of the glass body.

8. A radiation source according to claim 7, comprising a plurality of compressed-air flow channels defined within the reflector, each compressed-air flow channel of the plurality of compressed-air flow channels comprising outlet openings directed toward the ends of the halogen lamp, the outlet openings configured to supply compressed air that is turbulent around one of the ends of the glass body and the regions near the ends of the glass body.

9. A radiation source according to claim 6, comprising water channels defined in the reflector, the water channels pass through regions of the reflector that are adjacent to ends of the halogen lamp.

10. A radiation source according to claim 1, comprising plug-contact bases that are associated with heat-conducting devices, the plug-contact bases and the heat-conducting devices configured to transfer heat into the reflector.

11. A radiation source according to claim 1, wherein the reflector is constructed as a massive extruded profile made of a material with high thermal conductivity.

12. A radiation source according to claim 6, further comprising flow channels for a coolant fluid, the flow channels pressed into the extruded profile.

13. A radiation source according to claim 11, wherein a cross-sectional shape of an outer contour of the extruded profile is substantially rectangular and a cross section of the reflector surface is substantially W-shaped, the radiation source further comprising at least two coolant-fluid flow channels pressed into a foot region of the W-shape.

14. An irradiation arrangement comprising a plurality of the radiation sources according to claim 1, wherein at least two of the radiation sources are disposed in series in a row and lined up end to end, wherein the radiation flux density is substantially constant over an entire longitudinal extent of the row of radiation sources between an outermost point of a first source of the row radiation sources and an outermost point of a last radiation source in the row of radiation sources.

15. An irradiation arrangement according to claim 14, further comprising coolant-fluid flow channels associated with the row of radiation sources, the coolant-fluid flow channels of adjacent radiation sources of the row of radiation sources aligned with one another and connected together to form continuous flow channels, each continuous flow channel having a connection element through which coolant fluid is supplied to a first radiation source of the radiation sources in the row.

16. A radiation source according to claim 1, wherein the first end and the second end of the glass body extend through the reflector, and wherein the connectors extend through a surface of the reflector.

17. A radiation source according to claim 1, wherein substantially linear portions of the at least one filament extend through the first end and the second end of the glass body to the connectors.

18. A radiation source according to claim 1, wherein the at least one filament includes a spiral section that extends from the first bent region to the second bent region of the glass body.

19. A radiation source configured to generate electromagnetic radiation having a major effective component in a near-infrared region, said radiation source comprising:
  a glass body having a tubular shape and including a first bent region adjacent a first end of the glass body, a second bent region adjacent a second end of the glass body, and a substantially linear region extending between the first bent region and the second bent region;
  at least one spiral filament coupled within the glass body and configured to generate a substantially constant radiation flux density of the radiation source in a longitudinal direction of the radiation source between outermost points of the first end and the second end;
  the at least one spiral filament being at least one of thicker and more densely wound in transitional regions between the substantially linear region of the glass body and the bent regions of the glass body; and
  a reflector positioned adjacent to the glass body and defining a reflector surface, the first end of the glass body and the second end of the glass body at least partially extending through the reflector.

20. A radiation source configured to generate electromagnetic radiation having a major effective component in a near-infrared region, said radiation source comprising:
  a glass body having a tubular shape and including a first bent region adjacent a first end of the glass body, a second bent region adjacent a second end of the glass body, and a substantially linear region extending between the first bent region and the second bent region; and
  at least one spiral filament coupled within the glass body, the at least one spiral filament being at least one of thicker and more densely wound in transitional regions between the substantially linear region of the glass body and the bent regions of the glass body.

* * * * *